MULTIFREQUENCY PULSE TRANSMISSION SYSTEM

Filed Dec. 28, 1962 3 Sheets-Sheet 1

INVENTOR
W. W. STURDY
BY E. J. Cluider
ATTORNEY

July 12, 1966 W. W. STURDY 3,260,994

MULTIFREQUENCY PULSE TRANSMISSION SYSTEM

Filed Dec. 28, 1962 3 Sheets-Sheet 2

July 12, 1966 W. W. STURDY 3,260,994

MULTIFREQUENCY PULSE TRANSMISSION SYSTEM

Filed Dec. 28, 1962 3 Sheets-Sheet 3

United States Patent Office 3,260,994

Patented July 12, 1966

3,260,994

MULTIFREQUENCY PULSE TRANSMISSION SYSTEM

William W. Sturdy, Florham Park, N.J., assignor to Bell Telephone Laboratories, Incorporated, New York, N.Y., a corporation of New York

Filed Dec. 28, 1962, Ser. No. 248,149

10 Claims. (Cl. 340—146.1)

This invention relates to high speed pulse transmission and more particularly to pulse transmission systems involving multipath propagation, such as UHF radio, for example. The general object of the invention is to enhance the reliability of pulse transmission systems.

In radio transmission at frequencies where adequate signal strength cannot be provided by ground wave propagation, pulse transmission is hindered by the fact that multipath propagation may cause severe elongation of received pulses to the extent that received pulses are many times the length of the corresponding transmitted pulses. Thus, for example, with UHF pulse radio transmission at even relatively short distances, such as twenty-five miles, pulse elongation on the order of 10 microseconds may occur. Pulse elongations as great as 80 milliseconds have been experienced with lower VHF frequencies used in tropospheric scatter systems with transmission path lengths on the order of 4,000 miles. Additionally, if transmitted signals include only discrete pulses of a single RF carrier frequency, separated by periods of no transmission, the no-transmission period required to permit a receiver to distinguish between pulses increases with increasing transmission distances and, at the longer distances, multipath propagation often results in the reception of two or more discrete pulses, separated in time, for each transmitted pulse.

One approach to the solution of the problems indicated is to employ a first distinct frequency composition for all of the pulses in each alternative group of pulses and a second frequency composition for all of the pulses in each intermediate group of pulses. The receiver can then be synchronized to the transmitting frequency modes of the transmitter. Such a system is disclosed, for example, by A. E. Bachelet and J. S. Bomba in an application, Serial No. 70,482, filed November 21, 1960, and now Patent No. 3,178,643. Systems of the type disclosed by Bachelet, however, are designed primarily for wire transmission where the major problem, although analogous to the problem of multipath radio transmission, relates primarily to a substantially simpler problem, namely that of interferenece caused by echoes. As a result, such systems are relatively ineffective in overcoming the difficulties presented by radio transmission where interference may result not only from the effects of multipath propagation but also from the transmission of other transmission systems operating in the same general frequency band.

Accordingly, a specific object of the invention is to reduce the probability of acceptance of erroneous massage characters by the receiver of a radio pulse communication system, which characters may result from the effects of multipath propagation or from the transmissions of other transmission systems operating in the same frequency band.

Another object is to reduce the level of pulse transmission degradation that normally results from the presence of multipath propagation effects.

An additional object is to improve the security of pulse transmission systems operating under conditions involving multipath propagation.

These and other objects are attained in accordance with the principles of the invention by employing a distinctive combination of frequency keying sequences directly related to the time difference occurring between the shortest and longest effective multipath. Additionally, a unique combination of pulse validity testing circuits, memory circuits and logic circuits is employed at the receiving end to preclude the acceptance of any frequency sequence combinations that are incompatible in any way with the preselected frequency keying sequences of the transmitter.

In accordance with one aspect of the invention, a unique sequence of frequencies is employed to transmit the pulses in each message frame, a message frame consisting of a preselected number of time slots. A MARK pulse or a SPACE pulse is transmitted in each time slot and a SYNCH pulse consisting of two or more frequencies is transmitted at the beginning of each frame. The time slots in each frame provide for the transmission of one or more characters. For each transmitter-receiver link in the system a frequency sequence for MARK pulses is assigned with the number of frequencies being equal to the number of information time slots per frame. A single frequency for SPACE pulses is assigned. Although, in accordance with the invention, a different frequency sequence may be assigned for SPACE pulses rather than employing a single SPACE pulse frequency, the additional protection against spurious pulse reception is attained only at the cost of an increase in the frequency bandwidth requirements for a given error rate.

The transmitter is arranged, in accordance with the invention, to start the same MARK frequency sequence with the first MARK pulse of each new frame and then to step to the succeeding frequency sequence whenever the next MARK pulse occurs. The receiver is synchronized by the SYNCH pulses so that after lock-on only the proper time slot is monitored for the appearance of the SYNCH pulse. The receiver is arranged to monitor the first MARK frequency continuously after the receipt of the SYNCH pulse until a MARK pulse appears and then to monitor serially the next frequencies in the sequence for successive MARK's. The SPACE frequency is monitored continuously.

In accordance with another aspect of the invention, means are provided at the receiving end for rejecting any frame in which neither MARK nor a SPACE pulse is accepted in any one time slot. Additionally, any time slot in which both MARK and SPACE signals are received is interpreted as a MARK signal inasmuch as the probability of a spurious MARK signal of the proper frequency appearing in the proper time slot is exceedingly low and the probability of a spurious SPACE signal appearing in any time slot is normally high. Storage means are provided for accepted pulses, the storage means having a memory capacity of slightly more than twice as many pulses as there are in a frame length. By the use of such storage means the system is enabled to conduct a complete frequency sequence check for each frame. Storage capacity over and above that necessary to store two frames is employed to provide for the possibility of extra or spurious pulses occurring within a particular frame.

Although a communication system in accordance with the invention is designed primarily to enhance the reliability of pulse transmission in a multipath propagation environment, the principles of the invention also afford a relatively high degree of communication security inasmuch as the selection of the frequency sequences employed may be random and of course may be changed periodically.

Accordingly, one feature of the invention is a pulse communication system employing a preassigned frequency sequence for all of the MARK pulses in each pulse frame and a single frequency for each of the SPACE pulses in each frame.

Another feature of the invention is an arrangement in a pulse receiver for rejecting an entire pulse frame in which neither a MARK nor a SPACE pulse meets the preassigned frequency requirements for any one time slot.

An additional feature of the invention is a means for interpreting as a MARK pulse any time slot in which both MARK and SPACE signals are received.

These and additional objects and features will be fully apprehended from the following detailed description of an illustrative embodiment of the invention and from the accompanying drawing, in which.

To ensure clarity in the description of the illustrative embodiment of the invention certain arbitrary assumptions have been made with respect to the frequencies employed, the composition of a pulse frame and other related parameters. Thus, for example, SPACE pulse frequency is assumed to be 310 megacycles. A synchronizing signal is a pulse including both 300 megacycles and 320 megacycles. A frame consists of a SYNCH pulse, two 8-bit characters and a ninth bit, either a MARK or a SPACE, in each character which is used for signaling and supervision. Each signal time slot is 2 microseconds in duration. The pulse signals to be prepared for transmission and arranged in frames in the manner indicated are supplied by a plurality of channels of pulse data employing eight bits per character at a channel capacity of 2400 characters per second.

Figure 1:
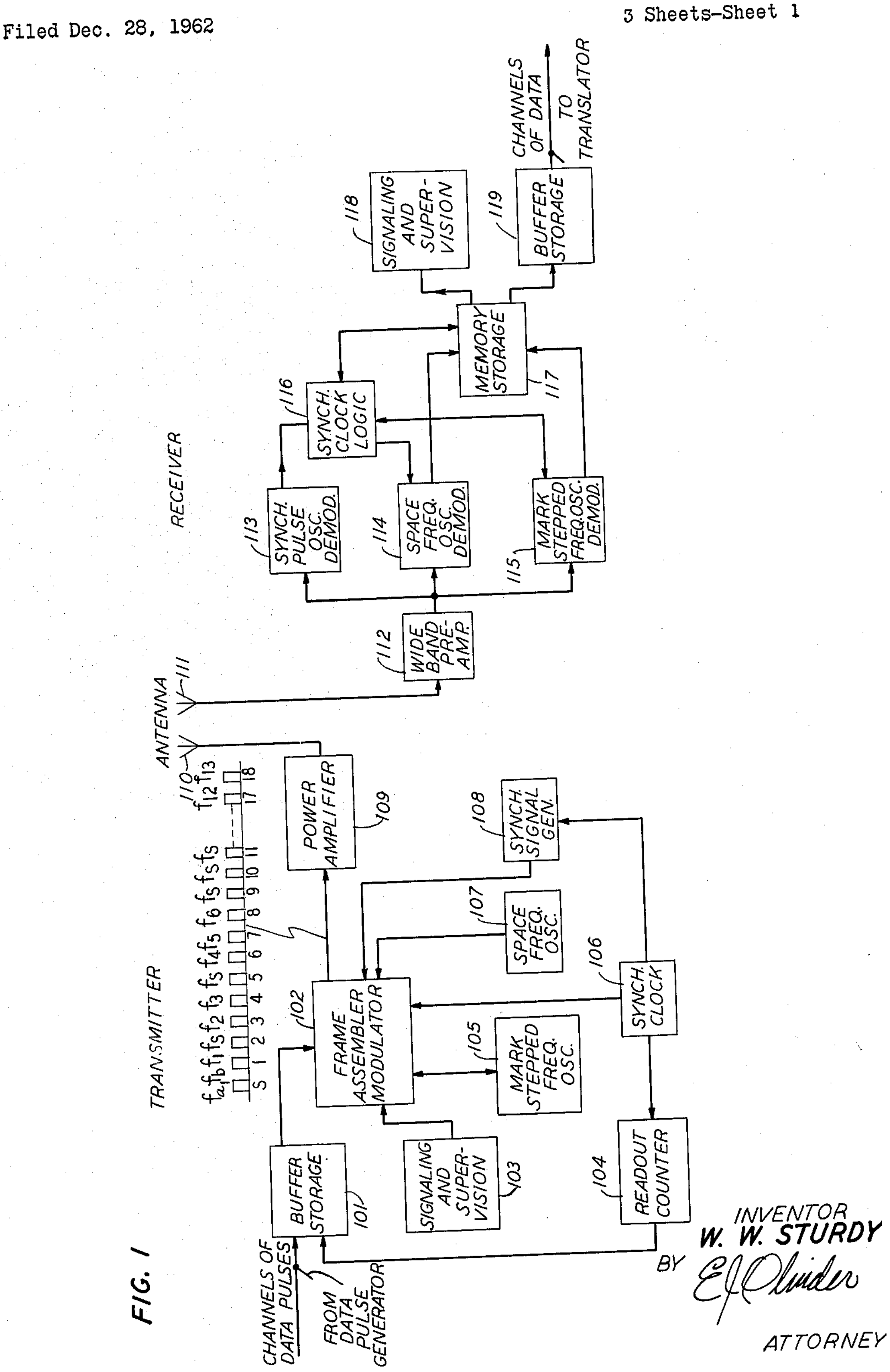
FIG. 1 is a block diagram of a pulse transmission and receiving system in accordance with the invention.

With reference now to FIG. 1, the signals to be processed for transmission are received from the data pulse channels indicated and are fed into buffer storage 101. Buffer storage 101 may be of any suitable conventional type, such as an arrangement of magnetic cores for example, and is employed simply to translate the data from parallel to serial form. Read-out counter 104 under control of SYNCH clock 106 causes the stored bits to be read out of buffer storage 101 in groups of eight into frame assembler modulator 102 where they are employed to modulate the carrier wave inputs from MARK-stepped frequency oscillator 105 and SPACE-frequency oscillator 107. This process is also under the timing control of SYNCH clock 106. Additional inputs to frame assembler modulator 102 are supplied from signaling and supervision equipment 103 and from SYNCH signal generator 108. The output of frame assembler modulator 102 takes the form of successive frames of 2 microsecond pulses of UHF carrier voltage. One illustrative frame consisting of 18 time slots plus a synchronizing pulse S is shown in FIG. 1 at the output of frame assembler modulator 102. SYNCH pulse S is the first pulse in the frame and is comprised of frequencies $f_a$ and $f_b$, which, as indicated above, are assumed to be 300 and 320 megacycles, respectively. Time slot 1 is occupied by a pulse of frequency $f_1$, time slot 2 is occupied by a pulse of frequency $f_s$, which is the SPACE pulse frequency, time slot 3 is occupied by a MARK pulse of frequency $f_2$, and each successive time slot in the eighteen time slots shown is occupied by a MARK pulse having a distinctive frequency in the MARK pulse frequency sequence or a SPACE pulse of frequency $f_s$, which, as indicated above, is assumed for illustrative purposes to be 310 megacycles. An illustrative MARK frequency sequence for each frame is indicated in the following table:

*Sequence of MARK frequencies within a FRAME*

| Mark No.: | Frequency in megacycles |
|---|---|
| 1 | 315 |
| 2 | 309 |
| 3 | 303 |
| 4 | 319 |
| 5 | 313 |
| 6 | 307 |
| 7 | 301 |
| 8 | 318 |
| 9 | 312 |
| 10 | 306 |
| 11 | 317 |
| 12 | 311 |
| 13 | 305 |
| 14 | 316 |
| 15 | 308 |
| 16 | 302 |
| 17 | 314 |
| 18 | 304 |

The output of frame assembler 102 as amplified by power amplifier 109 is fed to antenna 110 for transmission.

As indicated above, the frame assembler modulator 102 may be viewed conveniently as two substantially conventional equipments each performing its own conventional function. Thus as a pulse modulator, this unit simply modulates the output of oscillators 105 and 107 in accordance with the data signals received from buffer storage 101. The frame assembler function is a straightforward readout or arranging operation such as that performed in most conventional computers, which is to say that data indicia stored in parallel form in buffer storage 101 are read out in serial form by frame assembler 102 under the control of SYNCH clock 106 and readout counter 104.

At the receiver section shown in FIG. 1, the signals from receiving antenna 111 are amplified by a relatively wide band preamplifier 112 and are then fed to each of three oscillator demodulators, namely, SYNCH pulse oscillator demodulator 113, SPACE frequency oscillator demodulator 114, and MARK-stepped frequency oscillator demodulator 115.

Figure 2:
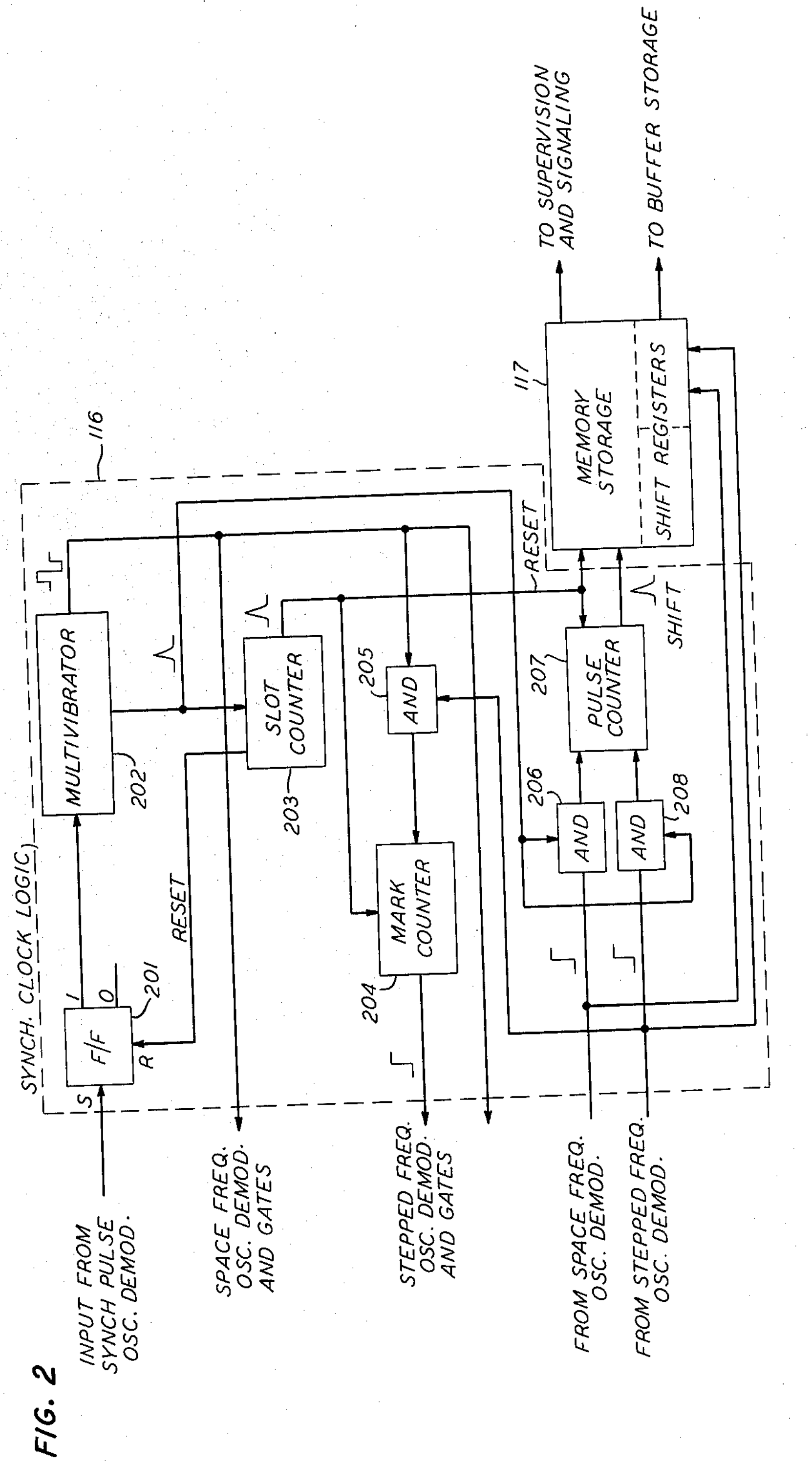
FIG. 2 is a detailed block diagram of the SYNCH clock logic block shown in the receiver of FIG. 1.
Figure 3:
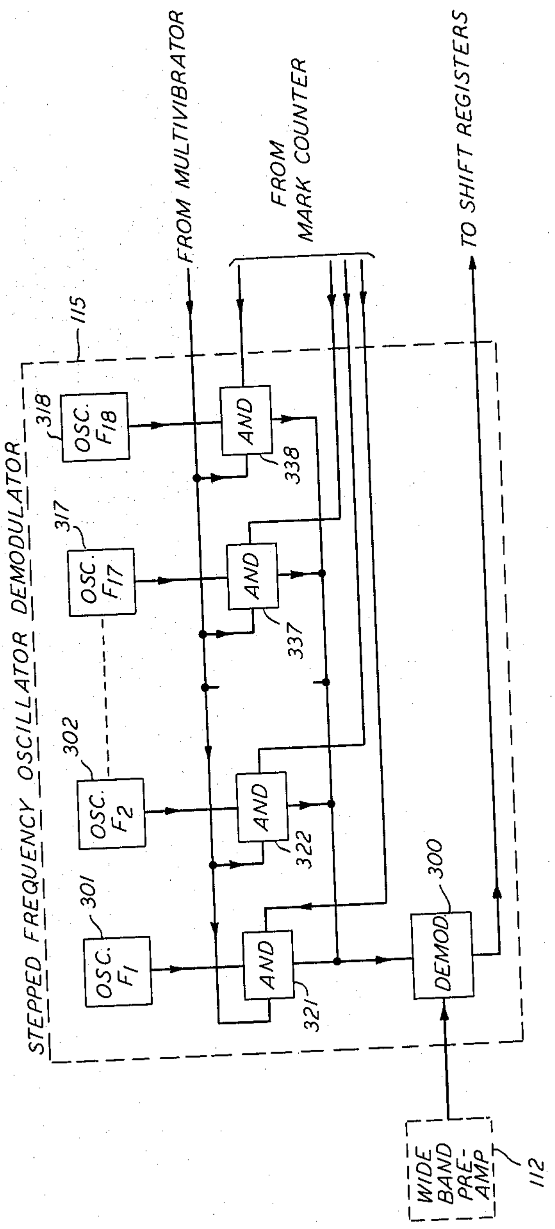
FIG. 3 is a detailed block diagram of the stepped frequency oscillator demodulator shown in the receiver section of FIG. 1.

Each of the demodulators 113, 114, and 115 is equipped with an appropriate heterodyning oscillator or oscillators, IF filters and rectifiers. Details of the MARK-stepped frequency oscillator demodulator 115, which is in part also illustrative of demodulators 113 and 114, are shown in FIG. 3, described in detail below. The output from SYNCH pulse oscillator demodulator 113 is a substantially square wave pulse derived from the oscillatory burst of the transmitted SYNCH pulse. The output of demodulator 113 is applied to SYNCH clock logic circuit 116 which in effect is the heart of the control system of the receiving section. The elements of SYNCH clock logic circuit 116 are shown in FIG. 2, described in detail below. In brief, the logic circuitry employed exercises control over the other elements of the system in determining whether the pulses following the synchronizing pulse constitute a desired signal in terms of the preassigned frequency sequence. During the validity examination, the pulse frame being examined and the frame next to be examined are retained by memory storage 117. Memory storage 117 may comprise any one of a number of types of conventional pulse storage arrangements such as a twistor or magnetic core array. The capacity of storage 117 is advantageously designed to exceed the number of information bits in two frames in order to provide for the possibility of the receipt of extraneous pulses. A capacity of 40 bits, for example, would meet this need in the embodiment described herein. If SYNCH clock logic circuit 116 determines that a stored frame is valid, a suitable signal is applied to memory 117 which causes the accepted frame to be read out into buffer storage 119. At the same time, appropriate supervision and signaling bits are read out into signaling and supervision circuit 118. If the pulses following the synchronizing bit do not constitute an acceptable signal, an appropriate signal from SYNCH clock logic circuit 116 erases them from memory 117 and resets MARK-stepped frequency oscillator demodulator 115 for the initial MARK pulse frequency of a new frame.

Details of the performance of the functions of SYNCH clock logic circuit 116 are best described with reference to FIG. 2. As shown, SYNCH clock logic circuit 116 includes flip-flop circuit 201, multivibrator 202, slot counter 203, MARK counter 204, AND gates 205, 206 and 208, and PULSE counter 207. Memory storage 117 includes a pair of conventional shift registers for recording incoming signal frames and means responsive to appropriate control signals for either transferring the contents of the shift register in parallel to buffer storage 119 (FIG. 1) or for erasing the entire stored contents.

In operation, flip-flop 201 is reset by slot counter 203 after each eighteen pulses, the data contents of a frame, by multivibrator 202. During the reset condition, multivibrator 202 is turned OFF. An incoming SYNCH pulse from SYNCH pulse oscillator demodulator 113 (FIG. 1) shifts flip-flop 201 from the reset to the set condition, and the logical 1 output turns multivibrator 202 ON. Multivibrator 202 has two outputs, one being a relatively square wave form, which may have a frequency on the order of 500 kilocycles, which forms one of the two inputs to AND gate 205. The second output from multivibrator 202, a spike pulse, as shown, which may be obtained simply by differentiating the positive leading edge of the square wave form, is employed to operate slot counter 203. This second output from multivibrator 202 is also employed to control the operation of PULSE counter 207 by way of AND gates 206 and 208.

Slot counter 203, which may comprise conventional solid state counting circuitry, for example, is designed to count eighteen of the output pulses of multivibrator 202 and then automatically resets itself and transmits a reset pulse to flip-flop 201, MARK counter 204, PULSE counter 207 and memory 117. Counters 204 and 207 may also be of conventional design and may, for example, be of substantially the same type as slot counter 203. The reset pulse from slot counter 203 changes flip-flop 201 to the reset condition and shifts MARK counter 204 and PULSE counter 207 to a ZERO count condition.

At memory 117, the reset pulse from slot counter 203 resets one of the shift registers to the logical 0 condition for the receipt of new data and also transfers the inputs from the SPACE and MARK oscillator demodulators 114 and 115 (FIG. 1) to that shift register.

As indicated above, pulse counter 207 counts the output pulses of both SPACE and MARK oscillator demodulators 114 and 115 for each data frame. If pulse counter 207 has counted eighteen pulses, which constitutes a complete message frame, it then, in the process of being reset to ZERO, transmits a shift pulse to memory 117 which causes the information in the shift register which has just been filled with a frame of data to be transferred in parallel to buffer storage 119. If the count is PULSE counted 207 is less than eighteen, the reset pulse is not permitted to cause the generation of a shift pulse and instead the shift register is cleared for new data as explained above.

The employment of outputs from MARK counter 204 in MARK oscillator demodulator 115 is shown in FIG. 3. Each of the oscillators 301 through 318 supplies a suitable one of the heterodyning frequencies $F_1$ through $F_{18}$ for a respective one of the frequencies in the MARK pulse frequencies sequence. Each of these heterodyning frequencies is fed to demodulator 300 by way of a respective one of the AND gates 321 through 338. An additional input to each of the AND gates 301 through 318 is supplied from MARK counter 204 (FIG. 2). The duration of the opening of AND gates 321 through 338 is controlled by the square wave output of multivibrator 202 (FIG. 2). As previously indicated, the output of demodulator 300 of MARK oscillator demodulator 115 is a D.-C. step voltage which is applied to one of the shaft registers in the memory circuit 117 (FIG. 2) and which is also employed to operate pulse counter 207 through AND gate 208.

It is to be understood that the embodiment described herein is merely illustrative of the principles of the invention. A wide variety of modifications may be made thereto by persons skilled in the art without departing from the spirit and scope of the invention.

What is claimed is:

1. In a pulse communication system wherein the transmission of each character is represented by a pulse frame which includes a plurality of MARK pulses interleaved with a plurality of SPACE pulses, means for transmitting the MARK pulses of each of said frames in the form of a succession of oscillatory bursts each having a different frequency composition in accordance with a first preselected frequency sequence, means for transmitting the SPACE pulses of each of said frame in the form of a succession of oscillatory bursts each having a frequency composition in accordance with a second preselected frequency sequence, means for receiving said frames including means for storing all of said bursts in each successive one of said first frames upon receipt, means for testing the validity of each pulse in a stored one of said frames on the basis of said preselected frequency, and means responsive to said testing means for erasing a stored frame from said storing means operative upon the determination of the presence of a spurious pulse in said last named frame.

2. In a pulse communication system, in combination, means for transmitting successive frames of pulses, each of said frames being preceded by a synchronizing pulse comprising an oscillatory burst including at least two distinct frequencies, each of said frames including a plurality of time slots occupied by a succession of MARK pulses interleaved with a succession of SPACE pulses, each of said MARK pulses in any one of said frames comprising a unique oscillatory burst in accordance with a preselected frequency sequence, each of said SPACE pulses in any one of said frames comprising an oscillatory burst of a single common frequency, all of the pulses in any one of said frames being representative of at least one character, means for receiving said frames including means for testing the validity of the pulses in each of said frames in terms of the frequency of said SPACE pulses and in terms of the frequency and frequency sequence of said MARK pulses, said receiving means including means for rejecting any frame which includes a pulse determined as invalid in accordance with said testing terms.

3. In a pulse communication system, means for receiving trains of substantially square wave MARK pulses and SPACE pulses, means for grouping said pulses in pulse frames, each of said frames including a common number of time slots, each of said time slots being occupied by a MARK pulse or a SPACE pulse, all of said pulses in any one frame being indicative of at least one character, means for translating each of said MARK pulses in any one of said frames into a respective oscillatory burst of a unique frequency in conformance with a preselected MARK pulse frequency sequence, means for translating each of said SPACE pulses in any one of said frames into a respective oscillatory burst of a single common frequency differing from all of the frequencies in said frequency sequence, means for transmitting said frames operative after the operation of both of said translating means, means for receiving said frames transmitted by said transmitting means, said last named receiving means including means for converting said frames back into trains of substantially square wave pulses and means for rejecting any of said frames wherein said MARK pulses fail to conform to said preselected MARK pulse frequency sequence.

4. In a pulse communication system, transmitting equipment including means for receiving trains of substantially square wave MARK and SPACE pulses, means responsive to the receipt of said substantially square wave pulses for arranging said pulses in pulse frames, means for translating all of said MARK pulses in each of said frames into oscillatory bursts, each of said oscillatory bursts in any one of said frames being comprised of a unique frequency in conformance with a preselected MARK pulse frequency sequence, means for translating all of said SPACE pulses in each of said frames into oscillatory bursts, each of said last named oscillatory bursts in any one of said frames being comprised of a common frequency differing from the frequencies employed in said MARK pulse frequency sequence, means for generating a synchronizing oscillatory burst having a unique frequency composition, means for transmitting successive ones of said frames of oscillatory burst MARK pulses and oscillatory burst SPACE pulses, each of said frames being preceded by one of said synchronizing pulses, receiving equipment including means for rejecting any received one of said frames wherein a time slot of said frame is occupied by neither a MARK pulse nor a SPACE pulse and for rejecting any received one of said frames wherein a MARK pulse is not in conformance with said preselected MARK pulse frequency sequence, and means for translating accepted ones of said frames of oscillatory bursts into substantially square wave MARK and SPACE pulses.

5. In a pulse communication system wherein intelligence is transmitted in the form of MARK pulses and SPACE pulses, groups of said pulses being arranged in pulses frames each of said frames including a preselected number of MARK and SPACE pulses indicative of at least one intelligence character, each of said MARK pulses in one of said frames comprising an oscillatory burst having a unique frequency composition in accordance with a preselected frequency sequence, said frequency sequence being repeated for said MARK pulses in each successive one of said frames, each of said SPACE pulses in all of said frames comprising an oscillatory burst having a common frequency composition distinct from the frequency composition of any of said MARK pulses, each of said frames, upon transmission, being preceded by a synchronizing pulse having a frequency composition distinct from said MARK and SPACE pulses, first, second and third oscillator demodulators each responsive, respectively, to received ones of said synchronizing pulses, said MARK pulses and said SPACE pulses for generating respective substantially square wave pulse outputs, means for storing said substantially square wave pulse outputs for all of said received MARK and SPACE pulses in at least two of said pulse frames, logic circuitry responsive to one of said synchronizing pulses for testing the validity of the frequency sequence of said MARK and SPACE pulses and for generating a signal upon the determination of the validity of any one of said MARK or SPACE pulses, means jointly responsive to the coincident application of one of said last named signals and to one of said substantially square wave pulse outputs from said second or third oscillator demodulators for storing a corresponding electrical indication in said storing means, and means responsive to the final pulse in any one of said pulse frames, all of the pulses in said last named frame having been determined as valid, for applying corresponding substantially square wave pulses to an outgoing transmission channel.

6. In a pulse communication system receiving equipment for receiving a succession of pulse frames each being preceded by a synchronizing pulse of a distinct frequency composition, each of said frames including a plurality of MARK pulses having a distinct frequency composition in accordance with a preselected frequency sequence and a plurality of SPACE pulses each having a common distinct frequency, said equipment comprising, in combination, first means responsive to each of said synchronizing pulses for generating a series of control signals equal in number to the preselected number of time slots in one of said frames, second means jointly responsive to one of said control signals and to a valid one of said MARK pulses for generating a corresponding first substantially square wave signal, third means jointly responsive to one of said control signals and to a valid one of said SPACE pulses for generating a corresponding second substantially square wave signal, means for storing combinations of said first and second substantially square wave signals equal in number to the time slots contained in at least two of said frames, and means responsive to the final one of said control signals in any one of said frames for applying a full frame of pulses from said storing means to an outgoing transmission channel.

7. Apparatus in accordance with claim 6 wherein said first generating means comprises a first oscillator-demodulator, a flip-flop and a multivibrator, said oscillator demodulator being operatively responsive to one of said synchronizing pulses, said flip-flop being operatively responsive to the operation of said oscillator demodulator and said multivibrator being operatively responsive to the operation of said flip-flop.

8. Apparatus in accordance with claim 7 wherein said second generating means includes a second oscillator-demodulator operatively responsive to the coincidence of the application of one of said MARK pulses, valid in accordance with said frequency sequence and to an output from said multivibrator.

9. Apparatus in accordance with claim 7 wherein said third generating means includes a third oscillator demodulator operatively responsive to the coincidence of the application of one of said SPACE pulses, valid in accordance with said common frequency and to an output from said multivibrator.

10. Apparatus in accordance with claim 7 including dual function means responsive to the operation of said multivibrator for counting the time slots in one of said frames and for resetting said flip-flop upon the conclusion of the time slot count for one of said frames.

No references cited.

ROBERT C. BAILEY, *Primary Examiner.*

M. LISS, *Assistant Examiner.*